June 28, 1932.  A. R. GROB  1,865,061
NUTSCH FILTRATION
Filed Feb. 11, 1926
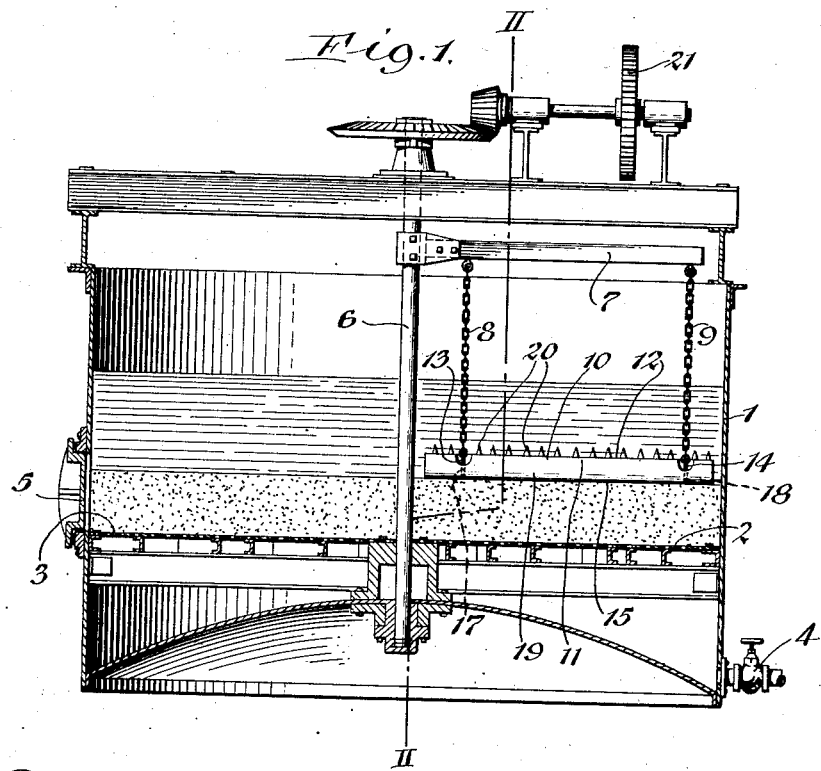
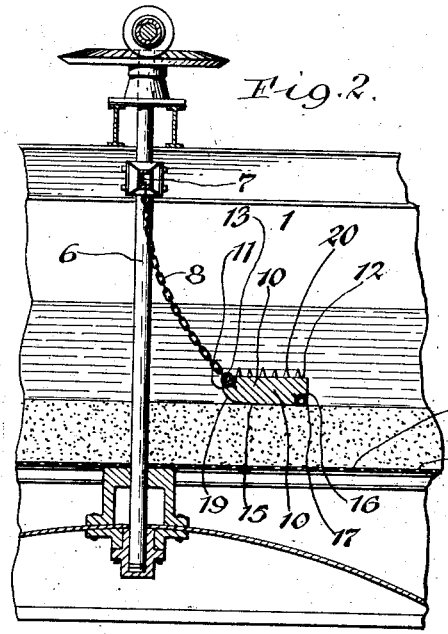
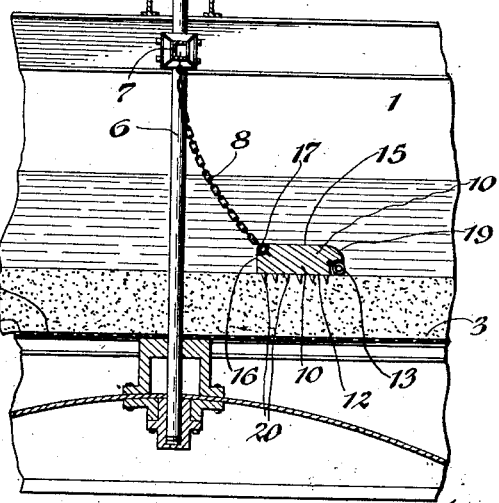
Inventor
A. R. GROB.
by William J. Karslake
Attorneys Patented June 28, 1932

1,865,061

UNITED STATES PATENT OFFICE

ARMIN R. GROB, OF HAMBURG, NEW YORK, ASSIGNOR TO NATIONAL ANILINE & CHEMICAL CO., INC., OF NEW YORK, N. Y., A CORPORATION OF NEW YORK

NUTSCH FILTRATION

Application filed February 11, 1926. Serial No. 87,503.

This invention relates to a method of filtration and apparatus for carrying out such a method.

Filters of the Nutsch type, having a perforated false-bottom, provide a simple means for straining or separating a precipitate. Their capacity is relatively great and can be further increased by the use of suction or pressure or both in addition to the action of gravity. Moreover slurries of relatively high concentration, which cannot be filtered by other means, are amenable to treatment in filters of this type. For obtaining a uniform filtering action, such filters may be provided with a drag or float which slides over and spreads the cake as it builds up and prevents the formation of cracks or breaks in the surface. However, the washing and removing of the cake, particularly when it is thick, is tedious and labor-consuming, and consequently the use of filters of this type heretofore has been restricted.

According to the present invention the utility of this type of filter is extended by providing a mechanical disintegration of the precipitate or cake so that it can be readily removed. It further provides an efficient agitation of the precipitate, for its refiltration or other use, with a minimum of labor and time.

A simple form of apparatus for the accomplishment of these steps in a Nutsch filter provided with a drag comprises incorporating an additional construction, namely, a non-rigidly guided and sliding scraper which is brought into operation after the cake formation and acts to disintegrate the cake. This may be independent but it is preferably made integral with the drag. The added step of scraping greatly facilitates the discharge of the cake, as it removes the necessity of manually breaking up the cake, and it also serves for agitation to cause the reformation of a slurry with liquid for subsequent use in such form or for the purpose of washing the precipitate more efficiently, prior to refiltering.

In the accompanying drawing

Fig. 1 is a vertical section of a Nutsch filter provided with a combined drag and scraper;

Fig. 2 is a vertical section on the line II—II of Fig. 1 showing the drag in action; and Fig. 3 is a view similar to Fig. 2 showing the scraper in action.

A Nutsch filter 1 has a perforated partition or false-bottom 2 therein upon which rests a suitable filtering medium 3. An outlet 4 is provided to remove filtrate that collects below the false-bottom; and a side opening 5 permits the removal of the precipitate or cake.

Within the filter is a central rotating column 6 carrying a horizontal arm 7. Two chains 8 and 9 depend from the arm and a bar 10 has near the edge 11 of one side 12 eyes 13 and 14 into which the free ends of the chains are hooked. On the opposite side 15 and near the edge 16 of the bar there is another pair of eyes 17, 18. The side 15 of the bar is smooth with a rounded forward edge 19, but the opposite side 12 is provided with teeth or projections 20. The eyes 17, 18 are preferably inset into the bar or otherwise disposed so that there is no projection from the surface 15. The column 6 is suitably supported and means 21, such as a gear drive, cause its rotation. Additional arms and bars can of course be provided.

In use the bar is drawn over or traverses the surface of the cake, as it settles on the filtering medium, with the smooth side 15 in contact therewith. This action levels and spreads the cake and closes up any openings or cracks that may form while the cake is building, and the chain suspension allows the bar to rise with the cake thereby rendering the mechanism self-adjusting. When the filtering is completed, the bar is unhooked from the chains, turned over, and the chains hooked into the eyes 17, 18. The teeth 20 are now in contact with the cake and, as the bar is drawn over its surface, the teeth scrape and disintegrate the cake so that it can be readily withdrawn or flushed through the side opening 5.

When it is desired to wash the cake or otherwise to reform a slurry, wash water or other liquid is admitted prior to the scraping so that the cake as it disintegrates goes into a suspension. The bar in this operation serves to agitate and mix as well as to disintegrate the cake so that a substantially uniform suspension follows. For washing the precipitate with a minimum of water this mode of operation is very effective.

I claim:

1. A method of filtration which comprises passing a slurry into a vessel having a filtering medium for separating precipitate, maintaining a substantially unbroken surface on the precipitate as it is separated, adding liquid after the separation, and disintegrating the precipitate in said liquid while in the vessel.

2. A method of filtration which comprises passing a slurry into a vessel having a filtering medium for separating precipitate, adding liquid to said precipitate after its separation, and agitating the precipitate in said liquid while in the vessel by means of a self-adjusting revolvable mechanism.

3. A method of filtration which comprises passing a slurry into a vessel having a filtering medium for separating precipitate, maintaining a substantially unbroken surface on the precipitate as it is separated by means of a self-adjusting revolvable mechanism, adding liquid after the separation, and disintegrating the precipitate in said liquid while in the vessel by means of said mechanism.

4. A filtering apparatus comprising in combination a vessel, a filtering medium within the vessel, said vessel having an outlet opening for withdrawing precipitate in a wall thereof above the filtering medium, and means within the vessel for removing precipitate deposited on said medium, said means comprising a means for admitting a liquid to said vessel to re-form a slurry of the precipitate above said filtering medium, and an agitator for disintegrating the precipitate.

5. A filtering apparatus comprising in combination a vessel, a filtering medium within said vessel, and a member in said vessel traversable over and displaceable toward and from said medium, said member having means for compacting and leveling precipitate during its deposition upon said medium, and means for disintegrating the precipitate after its deposition.

6. A filtering apparatus comprising in combination a vessel, a filtering medium within said vessel, an arm revolubly mounted relative to said vessel, and a drag member flexibly attached to and controlled by said arm said member having means for spreading precipitate during its deposition and for breaking up precipitate after its deposition on said medium.

7. A filtering apparatus comprising in combination a vessel, a filtering medium within the vessel, an arm revolvably mounted relative to said vessel, and a member flexibly attached to said arm, said member having one side formed to ride upon and spread precipitate separated by said medium, and the opposite side formed to disintegrate deposited precipitate.

8. A filtering apparatus comprising in combination a vessel, a filtering medium within the vessel, an arm revolvably mounted relative to said vessel, and a member flexibly attached to said arm, said member having one side with a relatively smooth surface and rounded forward edge, and its opposite side provided with projections.

9. In a filtering apparatus, a removable member, and a self-adjusting member having means for scraping and disintegrating the precipitate after its deposition, said member being flexibly connected to said revolvable member.

10. In a filtering appartus, a removable member, and a self-adjusting member having means for spreading the precipitate during its deposition and means for disintegrating the precipitate after its deposition, said member being flexibly connected to said revolvable member.

11. A filtering apparatus comprising in combination a vessel, a filtering medium within said vessel, an arm revolubly mounted relative to said vessel, and a member flexibly attached to said arm, said member being adapted for spreading the precipitate during its deposition.

12. In a filtering apparatus, a removable member, and a self-adjusting member having means for spreading the precipitate during its deposition, said member being flexibly connected to said revolvable member.

13. In a filtering apparatus, a removable member, and a member having a flat surface adapted for spreading the precipitate during its deposition, said member being chain-connected to said revolvable member.

14. In a filtering apparatus, a removable member, and a member having a flat surface adapted for spreading the precipitate during its deposition and a toothed surface adapted for disintegrating the precipitate after it is deposited, said member being chain connected to said revolvable member.

15. In a filtering apparatus, a removable member, and a member having a toothed surface adapted for disintegrating the precipitate after it is deposited, said member being chain-connected to said revolvable member.

16. A filter comprising in combination a filter chamber having a screened bottom, combined compacting and plowing means in said chamber adapted to be rotated over the cake and so constructed as to be capable at will of either compacting the cake alone or plowing the cake alone, but not of carrying out both operations simultaneously, and discharge openings so placed as to permit discharge of the cake by the plowing mechanism.

17. A filter comprising in combination a filter chamber having a screened bottom, at least one discharge opening in the chamber immediately above the screen, a vertical rotatable shaft centrally mounted in said chamber and combined plowing and compacting means driven by said shaft over the cake formed during filtration, said means being so constructed as to be capable at will of either compacting the cake alone or to plow the cake formed out through the discharge openings, but not being capable of performing both of these operations simultaneously.

18. A filter comprising in combination a chamber having a screened bottom, at least one discharge opening in the side of the chamber immediately above the screen, a vertical rotating shaft centrally mounted in said chamber and means for rotating said shaft in either direction, plowing and compacting means rotated by said shaft, said means being adapted to compact a cake formed in the filtration in one direction of rotation and to plow out said cake through the discharge opening in the reverse direction of rotation.

19. A filter comprising in combination a filtration chamber having a screened bottom, combined compacting and discharging means in said chamber so constructed as to be capable at will of either discharging or compacting alone, but not both operations simultaneously.

20. A filter comprising in combination a filtration chamber having a screened bottom, compacting and discharging means in said chamber so constructed as to be capable of either discharging or compacting alone but not both operations simultaneously.

In testimony whereof I affix my signature.

ARMIN R. GROB.